(12) United States Patent
Fuller

(10) Patent No.: US 8,544,933 B1
(45) Date of Patent: Oct. 1, 2013

(54) VEHICLE SUN VISOR SYSTEM

(71) Applicant: Gary M. Fuller, Bakersfield, CA (US)

(72) Inventor: Gary M. Fuller, Bakersfield, CA (US)

(*) Notice: Subject to any disclaimer, the term of this patent is extended or adjusted under 35 U.S.C. 154(b) by 0 days.

(21) Appl. No.: 13/624,011

(22) Filed: Sep. 21, 2012

(51) Int. Cl.
*B60J 3/02* (2006.01)

(52) U.S. Cl.
USPC ........................................ 296/97.6; 296/97.8

(58) Field of Classification Search
USPC .............................................. 296/97.6, 97.8
See application file for complete search history.

(56) References Cited

U.S. PATENT DOCUMENTS

| | | | |
|---|---|---|---|
| 4,792,176 A | 12/1988 | Karford | |
| 5,271,653 A * | 12/1993 | Shirley | 296/97.8 |
| 5,427,427 A | 6/1995 | Holter | |
| D361,970 S | 9/1995 | Zetterlund | |
| 5,466,029 A * | 11/1995 | Zetterlund | 296/97.8 |
| 5,662,370 A * | 9/1997 | Kassner | 296/97.6 |
| 6,012,758 A | 1/2000 | Fisher | |
| 6,139,084 A | 10/2000 | Miles | |
| 2011/0001332 A1 | 1/2011 | Weber | |
| 2011/0266825 A1 | 11/2011 | Bagioli | |

* cited by examiner

*Primary Examiner* — Joseph Pape

(57) ABSTRACT

A vehicle sun visor system provides shade by blocking sunlight passing into a vehicle cabin. The system includes a base plate configured for coupling to a vehicle sun shade. A plurality of protrusions is coupled to the base plate. The protrusions are positioned on a side of the base plate opposite the vehicle sun shade. A cover plate is detachably coupled to the base plate. A plurality of indentions extending into the cover plate, the indentations is complimentary to the protrusions. The cover plate is removable from and repositionable on the base plate.

3 Claims, 5 Drawing Sheets

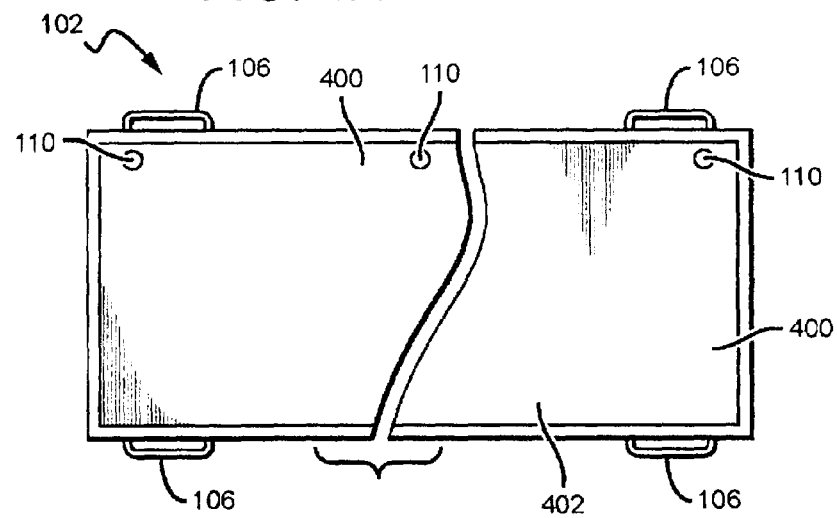
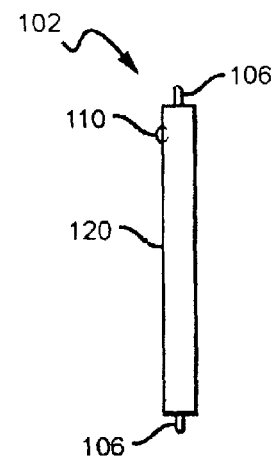
FIG. 4A
FIG. 4B
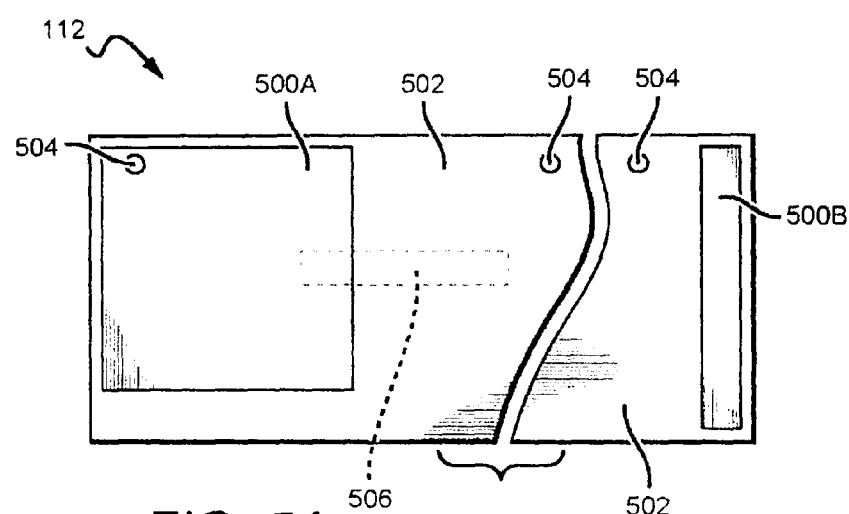
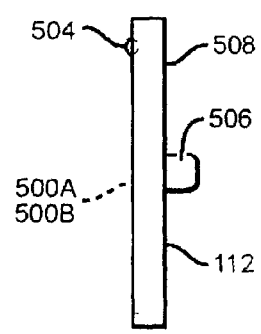
FIG. 5A
FIG. 5B

VEHICLE SUN VISOR SYSTEM

This application takes benefit of U.S. Provisional Patent Application 61/539,407 filed on Sep. 20, 2011 under 35 U.S.C. sec. 119.

BACKGROUND OF THE DISCLOSURE

Field of the Disclosure

The disclosure relates to sun shade devices and more particularly pertains to a new sun shade device for providing shade by blocking sunlight passing into a vehicle cabin.

SUMMARY OF THE DISCLOSURE

An embodiment of the disclosure meets the needs presented above by generally comprising a base plate configured for coupling to a vehicle sun shade. A plurality of protrusions is coupled to the base plate. The protrusions are positioned on a side of the base plate opposite the vehicle sun shade. A cover plate is detachably coupled to the base plate. A plurality of indentions extending into the cover plate, the indentations is complimentary to the protrusions. The cover plate is removable from and repositionable on the base plate.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIGS. 4A and 4B are front and side views, respectively, of one embodiment of a visor base plate having metallic material that is attractive to magnets (ferromagnetic or paramagnetic material).

FIGS. 5A and 5B are back plan and side views, respectively, of one embodiment of a side-shade extension plate having magnetic portions.

DESCRIPTION OF THE PREFERRED EMBODIMENT

Figure 1:
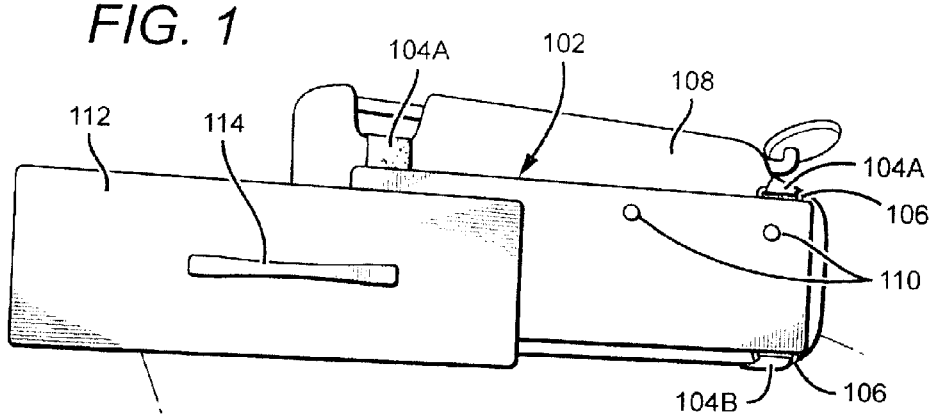
FIG. 1 is perspective view of one embodiment of a visor base plate strapped to an existing sun visor and a side-shade extension plate detachably coupled to and offset from the visor base plate.

With reference now to the drawings, and in particular to FIGS. 1 through 13 thereof, a new sun shade device embodying the principles and concepts of an embodiment of the disclosure and generally designated by the reference numeral 10 will be described.

As best illustrated in FIGS. 1 through 13, the vehicle sun visor system 10 generally comprises a visor base plate 102 coupled to a vehicle sun visor 108. In use, the device 10 blocks sun entering a vehicle cabin.

FIG. 1 illustrates one embodiment of a visor base plate 102 coupled to a back side of a standard vehicle sun visor 108, and a side-shade extension plate 112 that has been positioned by a user to extend the sun-blocking capability of the standard sun visor at a driver's left side window. The visor base plate 102 may have straps 104A,104B coupled to strap brackets 106, with the straps 104A,104B extending around a circumference of the sun visor 108 to hold the visor base plate 102 to the sun visor 108.

Figure 3:
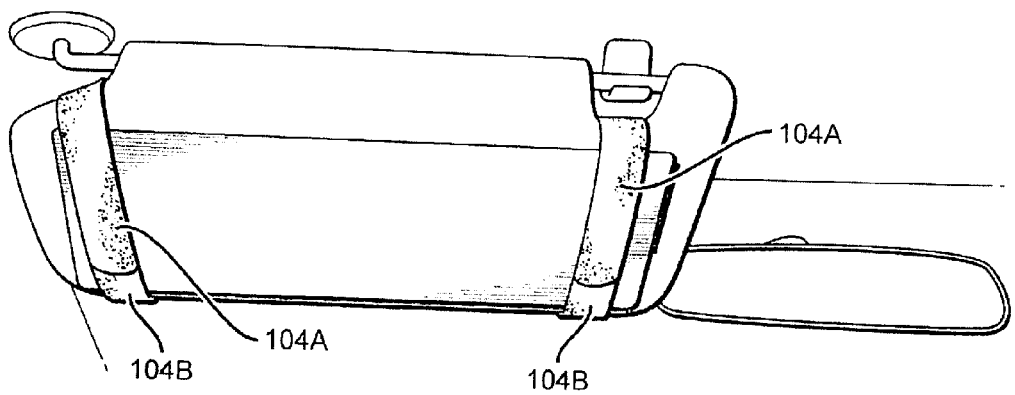
FIG. 3 is a perspective view of sun visor rotated to shade a front windshield illustrating overlapped hook and loop coupling straps extending around a circumference of the sun visor and coupling the visor base plate to the sun visor.

The respective pairs of upper and lower straps 104A and 104B may be overlapped and coupled together using a hook and loop coupling, illustrated in FIG. 3, or may be coupled together using a standard buckle and strap coupling, backpack clips, or a combination of hook and loop strapping and clips, or other attachment means (not shown). The strapping system may also include portions of elastic strapping to compensate for expansion/contraction due to temperature variations and maintain a secure coupling between the visor base plate 102 and sun visor 108. The visor base plate 102 may have a plurality of protrusions and/or indentations 110 extended and/or indented from its face to seat in respective complementary indentations and/or protrusions formed on a back side of a side-shade extension plate 112.

A side-shade extension plate handle 114,506 as shown FIGS. 1, 2, 5A and 5B, may extend from the face of the shade extension plate 112 to enable a user to easily grasp and move the side-shade extension plate 112 to different positions, unrestricted in both vertical and horizontal directions or any combination thereof, on the visor base plate 102. The side-shade extension plate 112 may be shaped and sized to match the shape and size of the visor base plate 102 so that it is, in the illustrated embodiment, generally rectangular. Other shapes and sizes could be incorporated into both the base and shade plates to accommodate the visor that they are being attached to (size, shape and function). Also, although the visor base plate 102 is sized to extend approximately the length of the sun visor 108, in alternative embodiments, the visor base plate 102 may be shorter in length and narrower in width than the sun visor 108 to reduce material costs.

Figure 2:
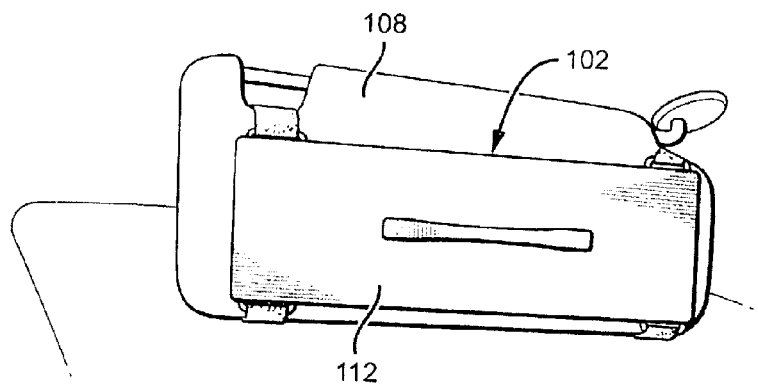
FIG. 2 is a perspective view of the side-shade extension plate first illustrated in FIG. 1 that is aligned with the visor base plate.

FIG. 2 illustrates the side-shade extension plate 112 illustrated in FIG. 1, but moved to a position to substantially overlap the visor base plate 102. In this position, the side-shade extension plate 112 does not extend beyond the underlying sun visor 108 to facilitate subsequent rotation of the sun visor 108, such as to a front-windshield position or up flush against an interior roof of the vehicle's cabin.

FIGS. 4A and 4B are front plan and side views, respectively, illustrating one embodiment of a visor base plate 102 that has metallic (magnetic attractive material) portions 400 on the front surface 402 of visor base plate 102. The depicted metallic portions 400 represent a ferromagnetic or paramagnetic material, such as thin metallic sheeting or metallic paint inserted, formed and or coated integrally and flush with the remaining portions of the visor base plate 102. The indentations/protrusions 110 and brackets 106 may be made/formed/molded and/or extruded from materials, such as, but not limited to, plastic, metal, wood, bonded & woven fabrics (glass, carbon, etc.) and may be incorporated into the metallic portion 120. The depicted strap brackets 106 may attach to straps 104A,104B with the straps 104A,104B coupling the visor base plate 102 to the sun visor 108. The brackets 106 may be made/formed/molded and/or extruded from the same materials, such as, but not limited to, plastic, metal, wood, bonded & woven fabrics (glass, carbon, etc.) as the visor base plate 102. The brackets 106 may also be made from separate materials, such as, but not limited to, metal rods, bars, etc. inserted, integrated and/or bonded into or to the visor base plate 102. The visor base plate brackets' 106 dimensions and locations on the visor base plate 102 may be sized to accommodate the straps 104A,104B they are being attached to, and located near the horizontal ends of the visor base plate 102 for secure coupling of the visor base plate 102 to the sun visor 108, and for clearance of straps 104A,104B from potential mirrors on the sun visor 108 opposite of the visor base plate 102. Shapes, dimensions and locations for the brackets 106 may be utilized to accommodate and provide for movement/adjustments of different size/type of straps 104A,104B to couple the visor base plate 102 to the sun visor and/also accommodate location of the straps.

FIGS. 5A and 5B are back plan and side views, respectively, illustrating one embodiment of the side-shade extension plate 112 that has a plurality of magnetic portions 500A and 500B. The plurality and size of depicted magnetic portions 500A and 500B represent a magnetized (ferromagnetic) material, such as thin magnetic sheeting inserted/formed internally and flush with the remaining portions of the side-shade extension plate 112 made/formed/molded and/or extruded from light blocking or shading materials, such as, but not limited to, plastic (solid-no light, transparent, tinted, etc.), wood, bonded & woven fabrics (glass, carbon, etc.). The size, shape, and placement of this magnetic material 500A and 500B depicted in FIGS. 5A & 5B represent standard magnetic material, such as commercially available magnetic sheeting, like common vinyl backed refrigerator magnets, strong enough to hold the side-shade extension plate 112 securely/flush against the front face of the base plate 102 when not in use, and weak enough to allow driver/user to easily pull the side-shade extension plate 112 from the base plate 102, and then magnetically strong/attractive enough to repeatedly replace, attach and couple it securely to the visor base plate 102 in an extended horizontal position, or in a lowered vertical position, or a combination thereof as depicted in FIG. 1. The side-shade extension plate 112 may have two magnetic areas, preferably, two rectangular magnetic areas, with magnetic material portion 500A having a larger area and magnetic force than magnetic area portion 500B so that a suitable magnetic area (force) is available to securely couple the side-shade extension plate 112 to the visor base plate 102 when a user repositions the side-shade extension plate 112 the greatest distance (diagonally), substantially off center from the visor base plate 102 to provide maximum additional side-window shading. The smaller magnetic material portion 500B on the side-shade extension plate 112, FIG. 5A, may be utilized to accommodate secure coupling of both sides of the side-shade extension plate 112 flush to the visor base plate 102.

Materials with greater magnetic strength, such as rare earth magnets, may also be used and placed in such a manner as to reduce the magnetic material and area 500A and 500B required to securely couple the side-shade extension plate 112 substantially off center from the visor base plate 102 to provide maximum additional side-window shading. Also, a battery powered electro magnet may also be used in lieu of or in combination with ferromagnetic material 500A,500B to couple and decouple the shades extension plate 112 to the visor base plate 102.

The side-shade extension plate 112 may have a plurality of protrusions and/or indentations 504 extended and/or indented from its back face 502 to seat in respective complementary indentations and/or protrusions 110 formed on the front side of a visor base plate 102 when the side-shade extension plate 112 is fully co-located over the visor base plate 102. In an alternative embodiment, the magnetic area portions 500A are distributed over the back surface 502 of the side-shade extension plate 112 to facilitate a variety of placements of the side-shade extension plate 112 on the visor base plate 102. The magnetic area portions 500A may also completely cover the back surface 502, in alternative embodiments of the side-shade extension plate 112. A handle 506 may also be provided on a front surface 508 of the side-shade extension plate 112 to enable a user to grasp the shade extension plate 112 for repositioning on the visor base plate 102. The handle 506 may be permanently attached to the side-shade extension plate 112. Also, the handle may be hinged to the to the front surface 508 of the side-shade extension plate such that it could be rotated flush against the surface 508 of the shade extension plate 112 when not in use and rotated back 90 degrees and temporarily locked into position for grabbing, moving and repositioning, by user, the side-shade extension plate 112. Also, the handle may be detachable and removed when not in use, or a combination thereof. Other shapes, sizes/dimensions and locations of the handle 506 on the side-shade extension plate 112 may be utilized to accommodate a user's grasp/grip to hold onto and move the side-shade extension plate.

Figure 6:
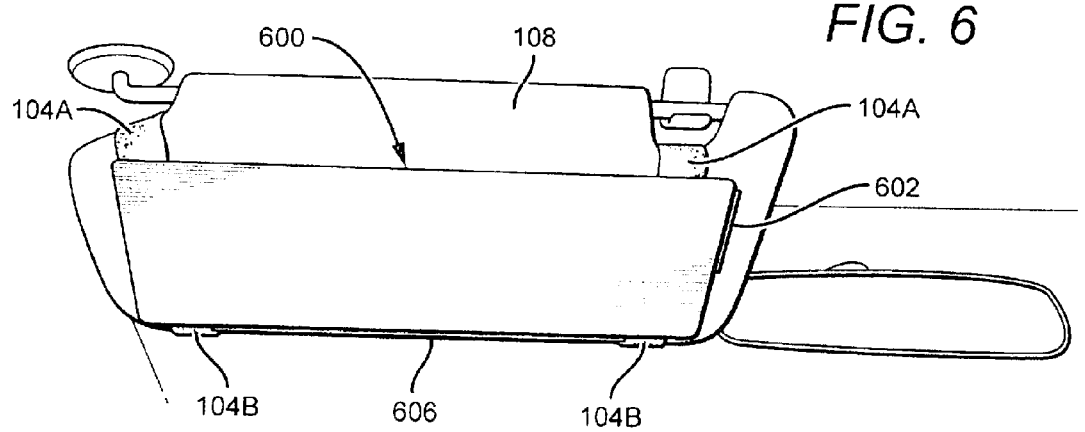
FIG. 6 is a perspective view of a sun visor rotated to shade a front windshield and a front windshield shade attachment coupled to the sun visor via visor base plate straps.
Figure 7:
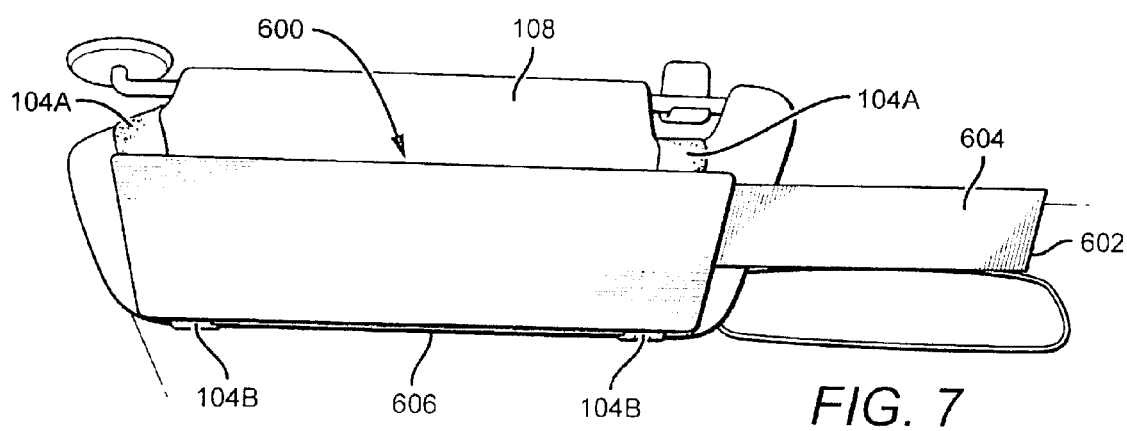
FIG. 7 is one embodiment of the front windshield shade attachment illustrated in FIG. 6 and having a side-shade extension extending from the front windshield shade attachment between vehicle roof and rear view mirror.
Figure 8:
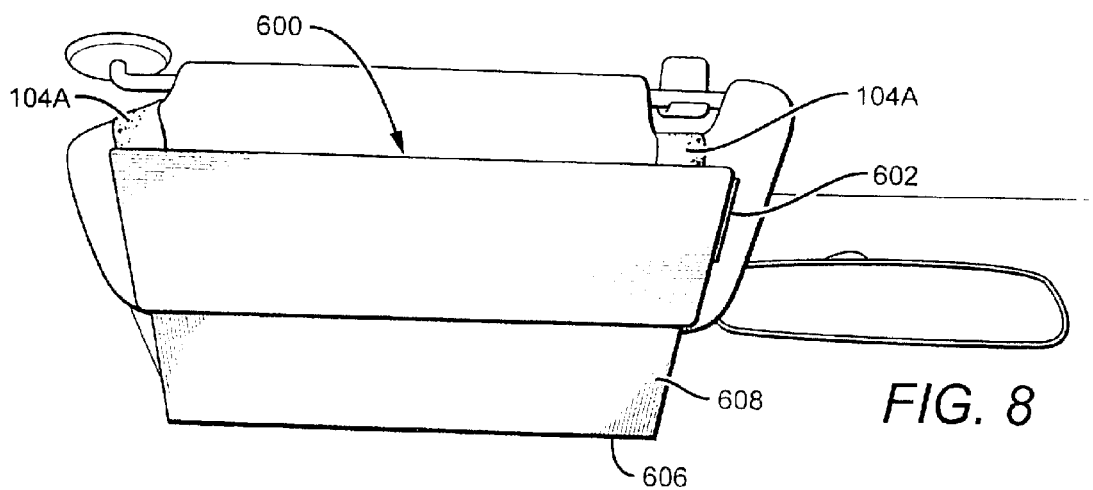
FIG. 8 is one embodiment of the front windshield shade attachment illustrated in FIG. 6 and having a vertical shade extension extending from the front windshield shade attachment beyond the bottom of the sun visor.

FIGS. 6-8 are perspective views of a sun visor illustrated in FIG. 1 that has been rotated to shade a front windshield. A front windshield shade attachment 600 may be coupled to the sun visor 108. The front windshield shade attachment 600 is coupled to the visor base plate straps 104A,104B which couple the visor base plate 102 (not shown) to the sun visor 108. The front windshield shade attachment 600 is coupled to the sun visor 108 on a side opposite from that of the visor base plate 102 (not shown), and is coupled to the exposed coupling loops on the straps 104A and 104B holding the visor base plate 102 on the opposite side of the sun visor 108.

A horizontal slider tab 602 extends beyond one side of the front windshield shade attachment 600 to enable a user to grasp and slide out an associated rear-view mirror shade extension 604 slidably guided in an interior cavity, with internal stops to prevent full extraction of the rear-view mirror shade extension from the front windshield shade attachment 600. As illustrated in FIG. 7, the rear-view mirror shade extension 604 is operable to slide out of the front windshield shade attachment 600 to block or reduce sunlight entering between the roof of the vehicle cabin and the rear-view mirror. Although illustrated as generally rectangular, the shape of the rear-view mirror shade extension 604 may be formed to avoid impinging on the rear-view mirror or any associated reading lights or control electronics.

A vertical slider tab 606 extends beyond the bottom of the front windshield shade attachment 600 to enable a user to grasp and slide out an associated vertical shade extension 608 slidably guided in an interior cavity, with internal stops to prevent full extraction of the vertical shade extension 608 from the front windshield shade attachment 600. As illustrated in FIG. 8, the vertical shade extension 608 is operable to slide out of the front windshield shade attachment 600 to block or reduce sunlight entering through the front windshield below the bottom of the sun visor 108, when rotated down in the lower position. All portions of the front windshield shade attachment 600, or any combinations thereof, may be made/formed/molded and/or extruded from light blocking or transparent-shading materials, such as, but not limited to, plastic, wood, metal, bonded & woven fabrics (glass, carbon, etc.).

Figures 9A, 9B:
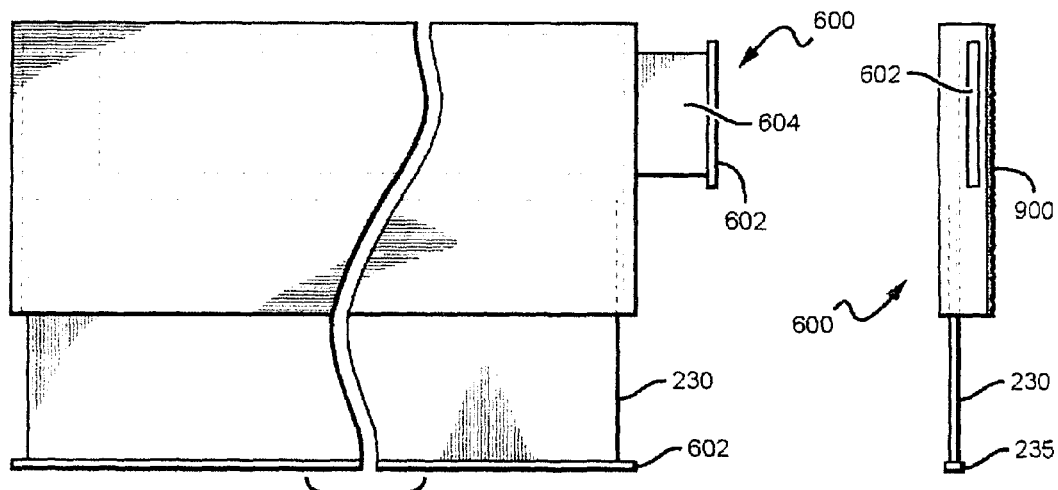
FIGS. 9A and 9B are front and side views, respectively, of one embodiment of a front windshield shade attachment having rear-view mirror and vertical shade extensions.

FIGS. 9A and 9B illustrate an embodiment of the exposed coupling hooks on strap/material 900 adhered to the back of the front windshield shade attachment 600, which in turn couples to the exposed coupling loops on the visor base plate straps 104A and 104B exposed on side of the sun visor 108 opposite of visor base plate 102 (See FIG. 1). Also, other means may be utilized for coupling the front windshield shade attachment 600 to the straps 104A and 104B such as clips or snaps attached to both the straps 104A and 104B and back side of front windshield shade attachment 600. As first illustrated in FIG. 6, the horizontal slider tab 602 may extend beyond one side of the front windshield shade attachment 600 to enable a user to grasp and slide out an associated rear-view mirror shade extension 604 slidably guided in an interior cavity. In FIGS. 9A and 9B, a second vertical slider 230 is illustrate provided with a slider tab 235 to grasp and pull out the second vertical slider 230 from the interior cavity of the front windshield shade attachment 600.

Figure 10:
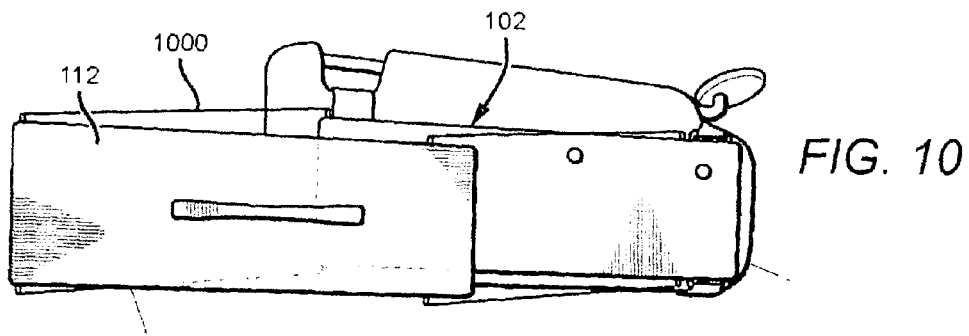
FIG. 10 is perspective view of one embodiment of a visor base plate strapped to an existing sun visor and a side-shade extension plate detachably coupled to and offset from the visor base plate and also illustrating four retractable cables from the visor plate connected to the side-shade extension plate.

As depicted in FIG. 10, the visor base plate 102 and side-shade extension plate 112 may be provided with a retractable cabling system 1000 to better-secure them together and retract the shade extension plate 112 back to the base plate 102 when it becomes detached (loss of magnetic bond) from the base plate.

Figure 11:
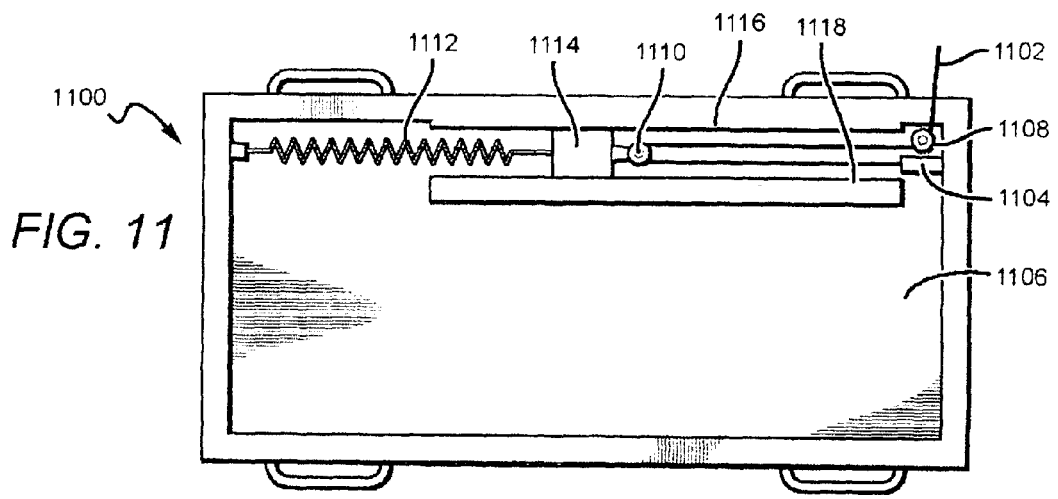
FIG. 11 is a cutaway plan view illustrating one embodiment of a visor base plate that has a retractable cable from the visor base plate connected to the side-shade extension plate at one location.

FIG. 11 is a cutaway plan view of the back side of a visor base plate 1100 illustrating one embodiment that uses one retractable cable 1102 to retractably couple a visor base plate 1100 to the shade extension plate 112 (See FIG. 1). In the illustrated embodiment, one cable 1102 is attached to a cable anchor 1104 in an interior 1106 of the visor base plate 1100. A cable exit pulley 1108 guides the cable 1102 out of the interior 1106. The cable 1102 extends within the interior 1106 around the cable exit pulley 1108 and through a tensioning pulley 1110 that is coupled to a first spring 1112 that provides pre-tensioning of the cable 1102. The tensioning pulley 1110 is coupled to a slider block 1114 that is slidably coupled within first and second guide slots (1116, 1118) so that as the cable is pulled out of the visor base plate 1100 the cable pulls the tensioning pulley 1110 forward as it rides on the slider block 1114 and the first spring 1112 is extended to provide cable tension. Extension of the cable out of the visor base plate 1100 may be limited either by full extension of the first spring 1112 or by a slider block stop (not shown) to limit translational travel of the slider block 1114. As the user allows the shade extension 112 to return towards the visor base plate 102, the first spring draws the slider block 1114 backwards within the first and second guide slots (1116, 1118) to retract the cable into the interior 1106.

Figure 12:
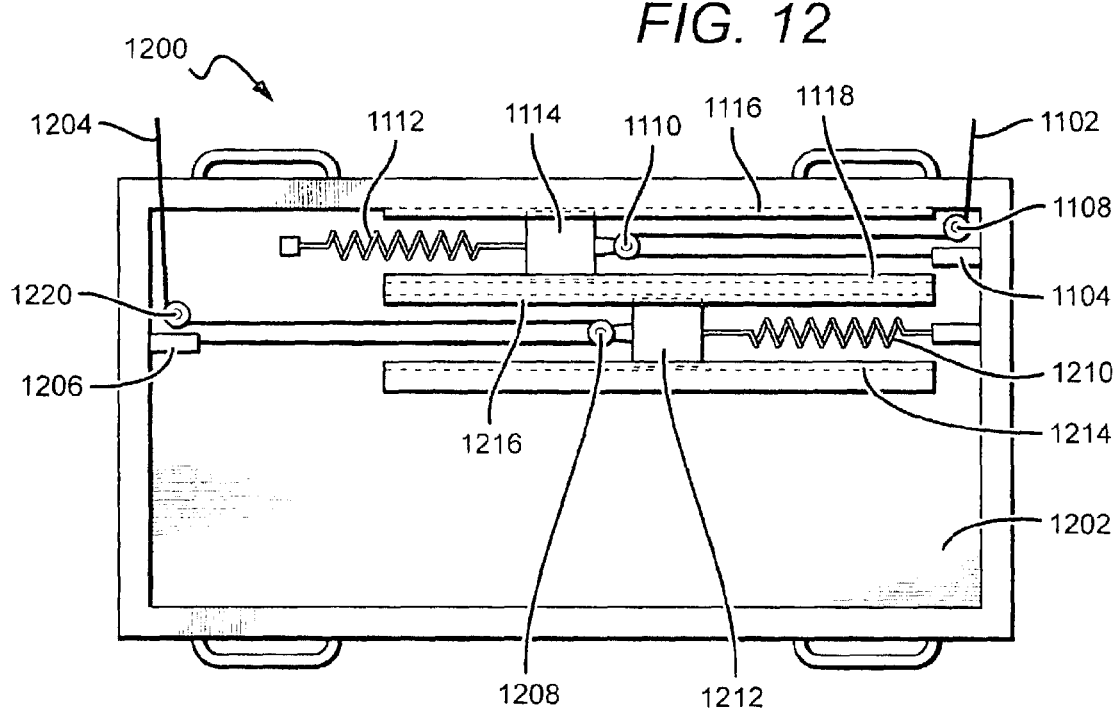
FIG. 12 is a cutaway plan view illustrating an interior of another embodiment of a visor base plate that has two retractable cables for coupling to the shade extension plate at two locations.

FIG. 12 is a cutaway plan view of the back side of a visor base plate illustrating one embodiment that uses two retractable cables to retractably couple a visor base plate 1200 to the shade extension plate 112 (See FIG. 1). As in the embodiment illustrated in FIG. 6, one cable 1102 is attached to the cable anchor 1104 in an interior 1202, with the cable 1102 extending within the interior 1202 around the cable exit pulley 1108 through the tensioning pulley 1110 that is coupled to the first spring 1112 to provide pre-tensioning of the cable 1102. The tensioning pulley 1110 is coupled to the slider block 1114 that may be slidably coupled within the first and second guide slots 1116,1118. A second cable 1204 is attached to a second cable anchor 1206 in the interior 1202, with the second cable extending within the interior 1202 through a second tensioning pulley 1208 that is coupled to a second spring 1210 to provide pre-tensioning of the second cable 1204. In a preferred embodiment, the pre-tensioning force in the second cable 1204 is approximately equal to the pre-tensioning force provided in the first cable 1102 to enable balanced extension and retraction forces in the cables (1102, 1204) for the user's convenience. The second tensioning pulley 1208 is coupled to a second slider block 1212 that may be slidably coupled within third and fourth guide slots (1214, 1216), with extension of the second cable 1204 limited either by full extension of the second spring 1210 or by a second slider block stop (not shown) to limit translational travel of the second slider block 1212. A second cable exit pulley 1220 may also be provided to guide the second cable 1204 out from the interior 1202.

Figure 13:
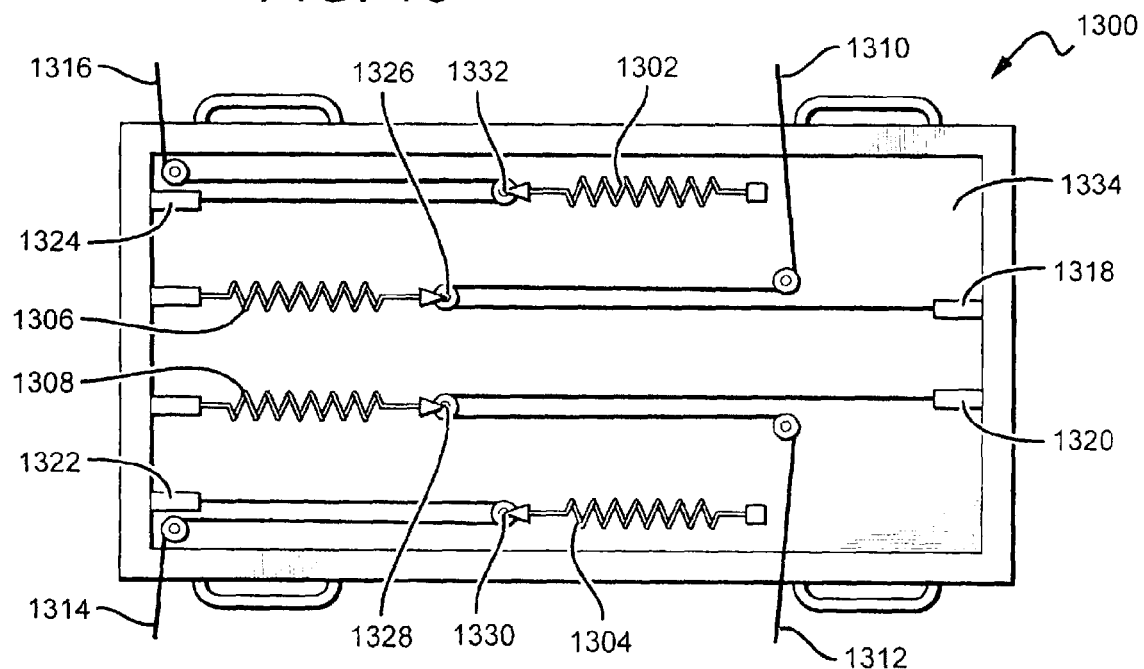
FIG. 13 is a cutaway plan view illustrating an interior of one embodiment of a visor base plate that has four retractable cables for coupling to the shade extension plate at four locations.

FIG. 13 is a cutaway plan view of the back side of a visor base plate illustrating one embodiment that uses four retractable cables to slidably attach a visor base plate 1300 to the shade extension plate 112 (See FIG. 1). Similar to the embodiments illustrated in FIGS. 10-12, first, second, third and fourth springs 1302,1304,1306,1308 provide pre-tensioning for their respective cables 1316,1314,1310,1312 that are attached to respective cable anchors 1324,1322,1318, 1320. Unlike the embodiments illustrated in FIG. 6-7, respective tensioning pulleys 1332,1330,1326,1328 may not be coupled to respective slider blocks to guide tensioning pulley travel. Rather, the tensioning pulleys 1332,1330,1326,1328 are allowed to travel freely within the interior 1334 as guided by tension in respective cables and springs.

Although FIGS. 11-13 illustrate the use of helical or coil springs 1112,1210,1302,1306,1308,1304 that become longer under load and serve to provide tension to retract the respective cables 1102,1204,1316,1310,1312,1314, other springs may be used. For example, a spiral torsion spring or rolled ribbon spring may be used to provide a retraction force for the cables.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A sun shade assembly comprising:
   a base plate configured for coupling to a vehicle sun shade, said base plate comprising a metallic portion;
   a plurality of protrusions coupled to said base plate, said protrusions being positioned on a side of said base plate opposite the vehicle sun shade;
   a cover plate detachably coupled to said base plate, said cover plate comprising a magnetic portion such that said cover portion is releasably magnetically coupled to said base plate;
   a plurality of indentations extending into said cover plate, said indentations being complimentary to said protrusions; and
   said cover plate being removable from and repositionable on said base plate.

2. The assembly of claim 1, further comprising a front windshield shade attachment configured for being coupled to the sun visor, said front windshield shade attachment being positioned on a side of the sun visor opposite said base plate.

3. A sun shade assembly comprising:
   a base plate, said base plate comprising a metallic portion;
   a plurality of protrusions coupled to and extending from said base plate;
   a cover plate, said cover plate comprising a magnetic portion such that said cover plate is releasably magnetically coupled to said base plate;
   a plurality of indentations extending into said cover plate, said protrusions being seated in said indentations when said base plate is coupled to said cover plate.

\* \* \* \* \*